June 7, 1955 W. W. WELTMER Re. 24,019

PIPE JOINT

Original Filed Jan. 10, 1950

Inventor
Wilton W. Weltmer
by Wayne B. Easton
Attorney

United States Patent Office

Re. 24,019
Reissued June 7, 1955

24,019

PIPE JOINT

Wilton W. Weltmer, Milwaukee, Wis., assignor to Allis-Chalmers Manufacturing Company, Milwaukee, Wis., a corporation of Delaware Original No. 2,583,401, dated January 22, 1952, Serial No. 137,680, January 10, 1950. Application for reissue August 23, 1952, Serial No. 306,076

5 Claims. (Cl. 285—211)

Matter enclosed in heavy brackets [ ] appears in the original patent but forms no part of this reissue specification; matter printed in italics indicates the additions made by reissue.

This invention relates to pipe joints and more particularly to discharge elbows of the type used on deep well pumps; and the principal object of the invention is to provide a new and improved pipe joint for joining together in angular relationship two or more pieces of pipe.

A specific use for my new and improved pipe joint is shown, merely by way of example, as a 90 degree discharge elbow for a deep well pump. It is to be understood, however, that although the invention will be herein described with reference to an elbow, for clearness of understanding, the construction is also applicable to T's, crosses and the like and is to be so interpreted in the claims. Thus, the word elbow as used herein comprehends broadly a joint between two or more pieces of pipe.

An object of this invention is to provide a new and improved fabricated pipe joint or elbow having a generally convex inner corner.

Another object of this invention is to provide a pipe joint or elbow having parts which may be fabricated simply and easily, the nature of such parts being such that they may be assembled and connected either in the shop or the field.

Another object of the invention is to provide a pipe joint or elbow having a generally convex inner corner, the component parts of which may be formed out of pipe and flat plate by simple cutting operations.

Another object of the invention is to provide a fabricated pipe joint or elbow, with a generally convex inner corner, which is applicable to elbows which bend more or less than 90 degrees as well as to 90 degree elbows.

The novel features of the invention and how the objects are attained will appear more fully from this specification and the accompanying drawing showing one embodiment of the invention and forming a part of this application, and all these novel features are intended to be pointed out in the claims.

Figure 1:
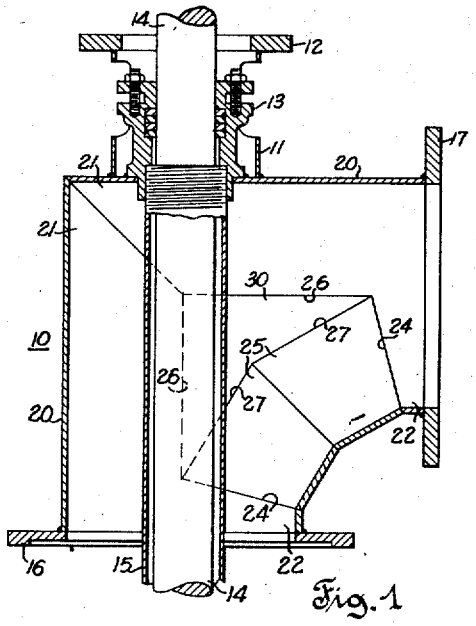
Fig. 1 is a sectional elevation of the upper end of a deep well pump embodying a discharge elbow made in accordance with my invention.
Figure 2:
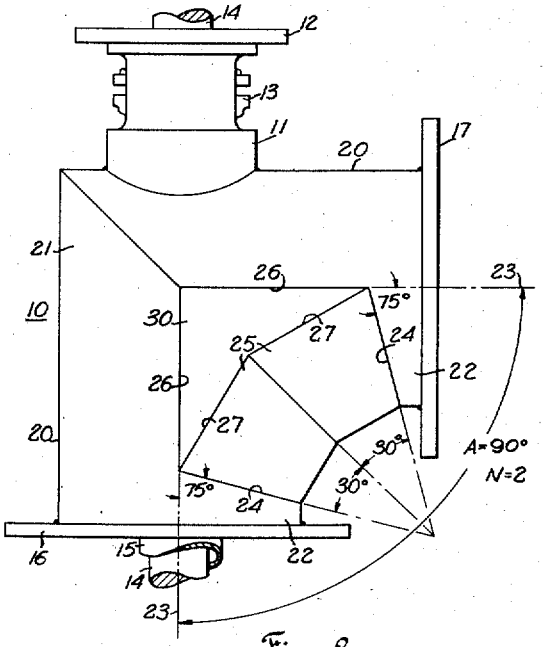
Fig. 2 is a similar to Fig. 1 and shows a side elevation of the elbow shown in Fig. 1.

Figs. 1 and 2 show, by way of example, the upper part of a deep well pump embodying a fabricated 90 degree pipe joint or discharge elbow 10 made in accordance with my invention.

A motor support 11, having a flange 12 to which a driving motor (not shown) may be bolted, is mounted on top of the elbow 10. Within the support 11 and also mounted on top of the elbow 10 is a bearing and stuffing box assembly 13 adapted to receive a driving shaft 14 which is coaxial with the vertical leg portion of the elbow 10.

The assembly 13 is threaded to receive a shaft tube 15 which encloses the shaft 14 and protects it from the material being pumped. The tube 15 is optional and may be omitted in some installations.

The elbow 10 has mounted thereon a bottom flange 16 for bolting to a flanged column pipe (not shown) and a side flange 17 for connecting to a flanged discharge line (not shown).

The above is a description of the various typical parts which may be associated with my new and improved pipe joint in a particular embodiment, in this case characterized by a discharge elbow for a deep well pump. A description of the pipe joint itself and the method of making follows.

Figs. 1 and 2 show an assembled 90 degree pipe joint or elbow 10 and Figs. 3 to 8 show the various parts therefor.

Figure 4:
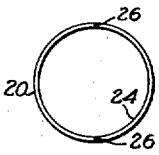
Figs. 3 and 4 are side and end views, respectively, of a component part of the elbow shown in Fig. 2.
Figure 3:
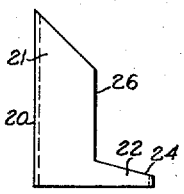

In the elbow 10 shown in Figs. 1 and 2 are two pipe elements 20, shown in detail in Figs. 3 and 4, each having an extended portion 21 of semicircular section and a nonextended portion 22. As this is a 90 degree elbow, in this instance, the pipe elements 20 are arranged with their axes 23 intersecting so as to form a 90 degree angle and the extended portions 21 abut in a plane disposed at an angle of 45 degrees to each of the axes 23 forming an outer corner of the elbow. If desired the outer corner may be rounded in any known manner.

Semielliptical edge 24 on each of the pipe elements 20 has a certain shape determined by the angle the plane, in which the edge is disposed, makes with the axis 23.

Figure 5:
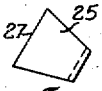
Figs. 5 and 6 are side and end views, respectively, of a component part of the elbow shown in Fig. 2.
Figure 6:
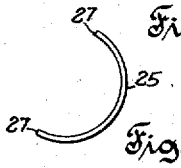
Figure 7:
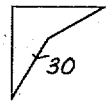
Figs. 7 and 8 are side and end views, respectively, of a component part of the elbow shown in Fig. 2.
Figure 8:
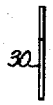

A generally convex inner corner is formed by arranging two gores 25, shown in detail in Figs. 5 and 6, between and in abutting relation with the semielliptic edges 24, on the pipe elements 20. Each of the gores 25 is of semicircular section, has the same radius as the pipe elements 20, and has a predetermined subtended angle relative to the angle which the plane containing the semielliptic edges 24 makes with the respective axes 23. The relationship of these angles will be explained hereinafter.

The axial edges 26 of the pipe elements 20 and the axial edges 27 of the gores 25 are, respectively, on both sides of the elbow 10, located in single planes. Two flat members 30, shown in detail in Figs. 7 and 8, conforming, respectively, to the size and shape of the respective spaces bonded by the axial edges 26 and 27 are disposed, respectively, in said spaces in abutting relation with said axial edges.

All of the above mentioned abutting edges are joined as by welding.

An important feature of the herein described elbow is that that the respective parts thereof may be readily formed out of pipe and flat plate by simple cutting operations. The parts formed according to my invention fit together accurately upon assemblying and thus avoid expensive manufacturing operations such as bending, flaring and the like.

Figure 9:
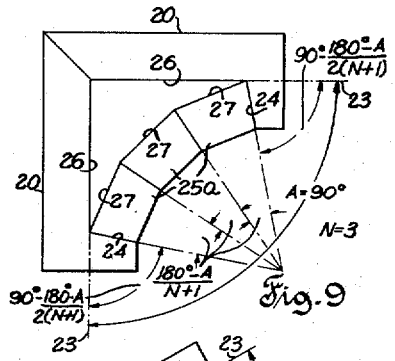
Fig. 9 is a layout showing the angular relationship between the parts of a three gore, 90 degree elbow.
Figure 10:
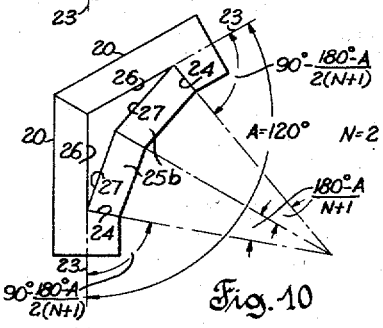
Fig. 10 is a layout showing the angular relationship between the parts of a two gore, 120 degree elbow.

Fig. 2 also illustrates the angular relationships between the pipe elements 10 and the gores 25. Figs. 9 and 10 illustrate the applicablility of the invention to elbows which bend more or less than 90 degrees and to the use of any number of gores 25a and 25b, respectively, depending on the degree of curvature desired on the inner corner.

Parts, other than the gores 25a and 26b, corresponding to the parts shown in Fig. 2 are designated by the same number.

Fig. 2 illustrates a 90 degree elbow with two gores 25 of semicircular section and having the same radius as the pipe elements 20. In determining the subtended angle of each of the gores 25 the number of gores is designated by the letter N and the angle formed by the intersection of the axes 23 of the pipe elements 20 is designated by the letter A. Thus, the subtended angle for each of the two gores in Fig. 2 is $$\frac{180°-A}{N+1} \text{ or } 30°$$

Although convenient it is not essential that the axial lengths of the gores 25 be the same. The angle the respective planes containing the semielliptical edges 24 make with the axes 23 is $$\left(90°-\frac{180°-A}{2(N+1)}\right) \text{ or } 75°$$

Fig. 9 illustrates a 90 degree elbow (A=90°) with three gores 25a (N=3). In this instance the subtended angle of each of the gores 25a is $$\frac{180°-A}{N+1} \text{ or } 22\tfrac{1}{2}°$$

The angle the respective planes containing the semielliptical edges 24 make with the axes 23 is $$\left(90°-\frac{180°-A}{2(N+1)}\right) \text{ or } 78\tfrac{3}{4}°$$

Fig. 10 illustrates a 120 degree elbow (A=120°) with two gores 25b (N=2). In this instance the subtended angle of each of the gores 25b is $$\frac{180°-A}{N+1} \text{ or } 20°$$

The angle the respective planes containing the semielliptical edges 24 make with the axes 23 is $$\left(90°-\frac{180°-A}{2(N+1)}\right) \text{ or } 80°$$

From the foregoing it will be apparent to those skilled in the art that the illustrated embodiments of the invention provide a new and improved pipe joint and the method of making same, and accordingly accomplishes the objects of the invention. On the other hand, it will also be obvious to those skilled in the art that the illustrated embodiments of the invention may be variously changed and modified or features thereof singly or collectively, embodied in other combinations than those illustrated without departing from the spirit of the invention and accordingly the disclosure herein is illustrative only, and the invention is not limited thereto.

It is claimed and desired to secure by Letters Patent:

1. An elbow or the like for connecting lengths of pipe, in combination: pipe elements with extended portions of semicircular section arranged so that their axes intersect, a generally convex inner corner formed by a plurality of abutting gores of semicircular section, each gore having the same radius as said pipe elements; a semielliptical edge on the nonextended portion of each of said pipe elements; the gore at each end of said plurality of gores abutting respectively said semielliptical edge on each pipe element; flat members conforming respectively to the size and shape of the respective spaces bounded by the axially extending edges of said pipe elements and said gores, said flat members disposed respectively in said spaces in abutting relation with said axially extending edges; and all of said abutting edges are joined as by welding.

2. An elbow or the like for connecting lengths of pipe comprising, in combination: pipe elements with extended portions of semicircular section arranged with their axes intersecting; a generally convex inner corner formed by a plurality of abutting symmetrical gores of semicircular section, each of said gores having the same radius as said pipe elements and each of said gores having semielliptical edges identical with such edges on the other gores; a semielliptical edge on the nonextended portion of each of said pipe elements identical with such edges on said gores; the gore at each end of said plurality of gores abutting respectively said semielliptical edge on each pipe element; flat members conforming respectively to the size and shape of the respective spaces bounded by the axially extending edges of said pipe elements and said gores, said flat members disposed respectively in said spaces in abutting relation with said axially extending edges; and all of said abutting edges are joined as by welding.

3. An elbow or the like for connecting lengths of pipe comprising, in combination: two pipe elements with extended portions of semicircular section, said extended portions abutting in a plane disposed at an angle of 45 degrees to the axis of each pipe element and forming an outer corner of said elbow; a generally convex inner corner formed by two gores of semicircular section in abutting relation to each other, each gore having the same radius as said pipe elements and a subtended angle of 30 degrees; a semielliptical edge on the nonextended portion of each of said pipe elements in planes disposed respectively at an angle of 75 degrees to the axis of each pipe element; each of said gores abutting respectively said semielliptical edge on each pipe element; two flat members conforming respectively to the size and shape of the respective spaces bounded by the axially extending edges of said pipe elements and said gores, said flat members disposed respectively in said spaces in abutting relation with said axially extending edges; and all of said abutting edges are joined as by welding.

*4. An elbow for connecting lengths of pipe comprising, in combination: two equal radii pipe elements each having a nonextended portion with a semielliptical edge and an extended portion of semicircular section with a semielliptical edge, said semielliptical edges of said nonextended portions being identical and said semielliptical edges of said extended portions being identical and aligned in abutting relation; a generally convex inner corner formed by gore means positioned between and in abutting relation to the semielliptical edges on said nonextended portions and comprising at least one gore, each gore having the same radius as said pipe elements and being of semicircular cross section and each gore being symmetrical with semielliptical edges identical to the semielliptical edges on said nonextended portions of said pipe elements; two flat members conforming respectively to the size and shape of two respective spaces bounded by axially extending edges of said pipe elements and said gore means, said flat members being disposed respectively in said spaces in abutting relation with the axially extending edges; and all of said abutting edges are joined as by welding.*

*5. An elbow for connecting lengths of pipe comprising, in combination: two equal radii pipe elements with extended portions of semicircular section, said extended portions abutting in a plane disposed at an angle of 45 degrees to the axis of each of the pipe elements to form the outer corner of the elbow; a nonextended portion on each of said pipe elements having a semielliptical edge, said semielliptical edges of said nonextended portions being identical; a generally convex inner corner formed by gore means positioned between and in abutting relation to the semielliptical edges on said nonextended portions and comprising at least one gore, each gore having the same radius as said pipe elements and being of semicircular cross section and each gore being symmetrical with semielliptical edges identical to the semielliptical edges on said nonextended portions of said pipe elements; two flat members conforming respectively to the size and shape of two respective spaces bounded by axially extending edges of said pipe elements and said gore means, said flat members being disposed respectively in said spaces in abutting*

*relation with the axially extending edges; and all of said abutting edges are joined as by welding.*

References Cited in the file of this patent or the original patent

UNITED STATES PATENTS

| | | |
|---|---|---|
| 2,003,538 | Hickey | June 4, 1935 |
| 2,147,431 | Ewing | Feb. 14, 1939 |
| 2,189,201 | Flader | Feb. 6, 1940 |
| 2,330,074 | Morris et al. | Sept. 21, 1943 |
| 2,334,424 | Singleton | Mar. 14, 1944 |

FOREIGN PATENTS

| | | |
|---|---|---|
| 184,082 | Great Britain | Aug. 10, 1922 |

OTHER REFERENCES

Sheetmetal handbook (1928), by William Neubecker (pp. 54 and 55), The Sheet Metal Publication Co., Tribune Bldg., 154 Nassau St., New York, N. Y., Library of Div. 14.